(12) United States Patent
Srinivasan

(10) Patent No.: US 7,023,837 B1
(45) Date of Patent: Apr. 4, 2006

(54) INTELLIGENT CALL ROUTING SYSTEM

(75) Inventor: Thiru Srinivasan, Highlands Ranch, CO (US)

(73) Assignee: Qwest Communications International, Inc., Denver, CO (US)

( * ) Notice: Subject to any disclaimer, the term of this patent is extended or adjusted under 35 U.S.C. 154(b) by 0 days.

(21) Appl. No.: 09/433,497

(22) Filed: Nov. 3, 1999

(51) Int. Cl.
*H04L 12/56* (2006.01)

(52) U.S. Cl. ...................................... 370/352

(58) Field of Classification Search ............... 370/351, 370/352, 353, 354, 355, 356, 357, 400, 401; 379/142.07, 201.06, 207.02, 207.03, 211.02, 379/220.01
See application file for complete search history.

(56) References Cited

U.S. PATENT DOCUMENTS

| | | | |
|---|---|---|---|
| 5,483,586 A * | 1/1996 | Sussman ................. | 379/218.01 |
| 6,021,126 A * | 2/2000 | White et al. ............. | 370/352 |
| 6,104,711 A * | 8/2000 | Voit ......................... | 370/352 |
| 6,161,128 A * | 12/2000 | Smyk ...................... | 709/205 |
| 6,163,605 A * | 12/2000 | Horrer et al. ........... | 379/211.01 |
| 6,185,565 B1 * | 2/2001 | Meubus et al. ........ | 707/10 |
| 6,205,135 B1 * | 3/2001 | Chinni et al. ........... | 370/356 |
| 6,240,449 B1 * | 5/2001 | Nadeau .................. | 709/223 |
| 6,445,694 B1 * | 9/2002 | Swartz .................... | 370/352 |
| 6,463,443 B1 * | 10/2002 | Thorner et al. ......... | 705/26 |
| 6,480,890 B1 * | 11/2002 | Lee et al. ............... | 709/223 |

OTHER PUBLICATIONS 3 pgs., MicroLegend SS7 Tutorial; http://www.microlegend.com/whatss7.html; Jun. 30, 1999.
2 pgs., MicroLegend SS7Tutorial—SS7 Protocol Stack; http://www.microlegend.com/stack.html; Jun. 30, 1999.
2 pgs., MicroLegend SS7 Tutorial—Transaciton Capabilities Application Part; http://www.microlegend.com/tcap.html; Jun. 30, 1999.
5 pgs., MicroLegend SS7 Tutorial—Message Transfer Part; http://www.microlegend.com/mtp.html; Jun. 30, 1999.

* cited by examiner

*Primary Examiner*—Ricky Ngo
*Assistant Examiner*—Derrick W Ferris
(74) *Attorney, Agent, or Firm*—Robert G. Crouch; Marsh Fischmann & Breyfogle LLP

(57) ABSTRACT

An automated call routing system accesses and employs information stored in a database located on a data network. Switching points within a Public Switch Telephone Network (PSTN) identify the telephone numbers, i.e. destination addresses received. The destination address may be associated with subscribers and, if so, a search may be initiated over the data network in a database included in a website. Once the information associated with the subscriber is located in the database, the PSTN will retrieve the information, the incoming call may be routed. The automated call routing information stored in the database may also be accessible to the subscriber over a connection established through a data network. Various interactive screen displays are provided through which the subscriber may enter or amend information contained therein.

23 Claims, 13 Drawing Sheets

| Subscriber Name | Login ID | Password | Subscriber Country | Time Zone | Type | Address |
|---|---|---|---|---|---|---|
| John Doe1 | johndo1 | XXXXXXX | USA | MDT | Work Phone, Home Phone, Numeric Pager, Toll-free Number, Cellular Phone, Voice Mail, Video Phone, E-mail | (1) 303-896-1000, (1) 303-788-1000, (1) 303-821-7889, (1) 1-800-345-2222, (1) 303-435-5565, (1) 303-896-3333, (1) 303-896-4444, jdoe1@abcinc.com |
| John Doe2 | johndo2 | XXXXXXX | India | IST | Home Phone, Cellular Phone, Home Office, Voice Mail, Home Fax, Desktop Data Conferencing, Desktop Video Conferencing, E-mail | (91) 44-233-2121, (91) 44-288-2122, (91) 44-233-2123, (91) 44-234-2100, (92) 44-233-2125, jdoe2@data.xyzinc.com, jdoe2@video.xyzinc.com, jdoe2@xyzinc.com |

| Destination Address ~62 | Destination Type ~64 | Travel Date ~66 | Visiting Country ~68 | Visiting Country Time Zone ~70 | Routing Address ~72 | Routing Address Type ~74 |
|---|---|---|---|---|---|---|
| (1) 303-896-1000, (1) 303-788-1000, (1) 303-435-5565 | Work Phone, Home Phone, Cellular Phone | 10/15/1998 | USA | EST | (1) 201-741-1000 | Work Phone |
| (1) 303-821-7889 | Numeric Pager | 10/15/1998 | USA | EST | (1) 201-821-1230 | Numeric Pager |
| (1) 1-800-345-2222 | Toll-free Number | 10/15/1998 | USA | EST | (1) 1-888-233-2456 | Toll-free Number |
| (1) 303-896-1000, (1) 303-788-1000, (1) 303-435-5565 | Work Phone, Home Phone, Cellular Phone | 10/16/1998 | USA | EST | (1) 201-695-1230 | Cellular Phone |
| (1) 303-821-7889 | Numeric Pager | 10/16/1998 | USA | EST | (1) 201-821-1230 | Numeric Pager |
| (1) 1-800-345-2222 | Toll-free Number | 10/16/1998 | USA | EST | (1) 1-888-233-2456 | Toll-free Number |
| (1) 303-896-1000, (1) 303-788-1000, (1) 303-435-5565 | Work Phone, Home Phone, Cellular Phone | 10/30/1998 | France | FST | (22) 12-345-3456 | Work Phone |
| (1) 303-821-7889 | Numeric Pager | 10/30/1998 | France | FST | (22) 12-451-3230 | Numeric Pager |
| (1) 1-800-345-2222 | Toll-free Number | 10/30/1998 | France | FST | (22) 1-800-333-2444 | Toll-free Number |
| (91) 44-233-2121, (91) 44-288-2122, (91) 44-233-2123, (91) 44-234-2100 | Home Phone, Cellular Phone, Home Office, Voice Mail | 12/10/1998 | S. Korea | KST | (31) 77-478-9999 | Cellular Phone |
| (91) 44-233-2124 | Home Fax | 12/10/1998 | S. Korea | KST | (31) 77-478-9980 | Work Fax |
| (91) 44-233-2121, (91) 44-288-2122, (91) 44-233-2123, (91) 44-234-2100 | Home Phone, Cellular Phone, Home Office, Voice Mail | 12/11/1998 | Singapore | SST | (20) 15-345-1234 | Work Phone |
| (91) 44-233-2124 | Home Fax | 12/11/1998 | Singapore | SST | (20) 15-345-1230 | Work Fax |
| (91) 44-233-2121, (91) 44-288-2122, (91) 44-233-2123, (91) 44-234-2100 | Home Phone, Cellular Phone, Home Office, Voice Mail | 12/30/1998 | Australia | EST | (81) 441-456-9834 | Voice Mail |
| (91) 44-233-2124 | Home Fax | 12/30/1998 | Australia | EST | (81) 441-456-9824 | Work Fax |

FIG. 4

| Destination Address | DBU Type | Day | Time Interval | Routing Address | Routing Address Type |
|---|---|---|---|---|---|
| (1) 303-896-1000, (1) 303-435-5565, (1) 303-896-4444 | Work Phone, Cellular Phone, Video Phone | Sunday | 12:01 AM - 12 Mid Night | (1) 303-896-3333 | Voice Mail |
| (1) 303-896-1000, (1) 303-435-6656, (1) 303-896-4444 | Work Phone, Cellular Phone, Video Phone | Monday | 12:01 AM - 8 AM | (1) 303-896-3333 | Voice Mail |
| (1) 303-788-1000 | Home Phone | Monday | 8:01 AM - 5 PM | (1) 303-896-1000 | Work Phone |
| (1) 303-788-1000 | Home Phone | Monday | 5:01 PM - 7 PM | (1) 303-435-6656 | Cellular Phone |
| (1) 303-896-1000, (1) 303-788-1000, (1) 303-435-5565, (1) 303-896-4444 | Work Phone, Home Phone, Cellular Phone, Video Phone | Monday | 10:01 PM - 12 Mid Night | (1) 303-896-3333 | Voice Mail |
| (1) 303-896-1000, (1) 303-435-6656, (1) 303-896-4444 | Work Phone, Cellular Phone, Video Phone | Tuesday | 12:01 AM - 8 AM | (1) 303-896-3333 | Voice Mail |
| (1) 303-788-1000 | Home Phone | Tuesday | 8:01 AM - 5 PM | (1) 303-896-1000 | Work Phone |
| (1) 303-788-1000 | Home Phone | Tuesday | 5:01 PM - 7 PM | (1) 303-435-6656 | Cellular Phone |
| (1) 303-896-1000, (1) 303-788-1000, (1) 303-435-5565, (1) 303-896-4444 | Work Phone, Home Phone, Cellular Phone, Video Phone | Tuesday | 10:01 PM - 12 Mid Night | (1) 303-896-3333 | Voice Mail |
| (1) 303-896-1000, (1) 303-435-6656, (1) 303-896-4444 | Work Phone, Cellular Phone, Video Phone | Wednesday | 12:01 AM - 8 AM | (1) 303-896-3333 | Voice Mail |
| (1) 303-788-1000 | Home Phone | Wednesday | 8:01 AM - 5 PM | (1) 303-896-1000 | Work Phone |
| (1) 303-788-1000 | Home Phone | Wednesday | 5:01 PM - 7 PM | (1) 303-435-6656 | Cellular Phone |
| (1) 303-896-1000, (1) 303-788-1000, (1) 303-435-5565, (1) 303-896-4444 | Work Phone, Home Phone, Cellular Phone, Video Phone | Wednesday | 10:01 PM - 12 Mid Night | (1) 303-896-3333 | Voice Mail |
| (1) 303-896-1000, (1) 303-435-6656, (1) 303-896-4444 | Work Phone, Cellular Phone, Video Phone | Thursday | 12:01 AM - 8 AM | (1) 303-896-3333 | Voice Mail |
| (1) 303-788-1000 | Home Phone | Thursday | 8:01 AM - 5 PM | (1) 303-896-1000 | Work Phone |
| (1) 303-788-1000 | Home Phone | Thursday | 5:01 PM - 7 PM | (1) 303-435-6656 | Cellular Phone |
| (1) 303-896-1000, (1) 303-788-1000, (1) 303-435-5565, (1) 303-896-4444 | Work Phone, Home Phone, Cellular Phone, Video Phone | Thursday | 10:01 PM - 12 Mid Night | (1) 303-896-3333 | Voice Mail |
| (1) 303-896-1000, (1) 303-435-6656, | Work Phone, Cellular Phone, | Friday | 12:01 AM - 8 AM | (1) 303-896-3333 | Voice Mail |

FIG. 5

| Destination Address | Destination Type | Day | Time Interval |
|---|---|---|---|
| (1) 303-821-7889 | Numeric Pager | Sunday | 12:01 AM - 12 Mid Night |
| (1) 303-821-7889 | Numeric Pager | Monday | 12:01 AM - 8 AM |
| (1) 303-821-7889 | Numeric Pager | Monday | 10:00 PM - 12 Mid Night |
| (1) 303-821-7889 | Numeric Pager | Tuesday | 12:01 AM - 8 AM |
| (1) 303-821-7889 | Numeric Pager | Tuesday | 10:00 PM - 12 Mid Night |
| (1) 303-821-7889 | Numeric Pager | Wednesday | 12:01 AM - 8 AM |
| (1) 303-821-7889 | Numeric Pager | Wednesday | 10:00 PM - 12 Mid Night |
| (1) 303-821-7889 | Numeric Pager | Thursday | 12:01 AM - 8 AM |
| (1) 303-821-7889 | Numeric Pager | Thursday | 10:00 PM - 12 Mid Night |
| (1) 303-821-7889 | Numeric Pager | Friday | 12:01 AM - 8 AM |
| (1) 303-821-7889 | Numeric Pager | Friday | 10:00 PM - 12 Mid Night |
| (1) 303-821-7889 | Numeric Pager | Saturday | 12:01 AM - 8 AM |
| (1) 303-821-7889 | Numeric Pager | Saturday | 10:00 PM - 12 Mid Night |

FIG. 6

| Icon Type: | Home Phone | ~142 |
| Icon Address: | (1) 303-788-1000 | ~144 |

Routing Table Section: ~146

| Travel Date | Visiting Country | Visiting Country Time Zone | Destination Address | Destination Address Type |
|---|---|---|---|---|
| 10/15/1998 | USA | EST / CST / MST / PST / HST | 201-741-1000 | Home Phone / Work Phone / Cellular Phone / Voice Mail |
| 10/16/1998 | USA | EST / CST / MST / PST / HST | 201-695-1230 | Home Phone / Work Phone / Cellular Phone / Voice Mail |
| 10/30/1998 | France | EST | 12-345-3456 | Home Phone / Work Phone / Cellular Phone / Voice Mail |

- 148 Travel Date
- 150 Visiting Country
- 152 Visiting Country Time Zone
- 154 Destination Address
- 156 Destination Address Type
- 158
- 146
- 160 OK
- 162 Add a Row
- CANCEL
- 140

FIG. 9

| Subscriber Country: | USA | Icon Type: | Work Phone |
| Time Zone: | MDT | Icon Address: | (1) 303-896-1000 |

Routing Table Section: 170

| Day — 174 | Time Interval — 176 | Destination Address — 178 | Destination Address Type — 180 |
|---|---|---|---|
| Sunday, Monday, Tuesday, Wednesday, Thursday | 12:01 AM - 12 Mid Night | 303-896-3333 | Home Phone, Work Phone, Cellular Phone, Voice Mail |
| Sunday, Monday, Tuesday, Wednesday, Thursday | 12:01 AM - 8 AM | 303-896-3333 | Home Phone, Work Phone, Cellular Phone, Voice Mail |

— 172

[OK] — 184    [Add a Row] — 186    [CANCEL]

FIG -10

| Subscriber Country: | USA | Icon Type: | Numeric Pager |
| Time Zone: | MDT | Icon Address: | (1) 303-821-7889 |

Routing Table Section:

| Day — 194 | Time Interval — 196 |
|---|---|
| Sunday, Monday, Tuesday, Wednesday, Thursday | 12:01 AM - 12 Mid Night |
| Monday, Tuesday, Wednesday, Thursday, Friday | 12:01 AM - 8 AM |

— 198 ← (left pointer to day list)
— 192 (table)

[OK] — 200    [Add a Row] — 198    [CANCEL]

INTELLIGENT CALL ROUTING SYSTEM

FIELD OF THE INVENTION

The invention described herein relates to a communications routing system, and more particularly to a telephone call routing system which employs a data network such as the Internet.

BACKGROUND ON THE INVENTION

Many phone companies today offer time-of-day, day-of-week, and date routing of telephone calls based on an architecture called Advanced Intelligent Networks (AIN) and as features of PBX phone systems. Through a Public Switch Telephone Network (PSTN) which employs AIN, a subscriber to this service may be allowed to program, through touch-tone inputs, the routing of incoming telephone calls to a particular phone number based on time-of-day, day-of-week, and date. Typically, AIN software is installed in the switches of the PSTN (for example, ESS, DMS, etc.) at the Service Control Point (SCP).

In operation, the call travels to the destination switch, which detects an AIN trigger, and sends a query to the SCP which contains the programed information as to how to route the call. Once the relevant information is located, the SCP forwards the call information to the destination switch which routes the call accordingly.

With regards to establishing telephonic connections, a number of Internet search engine companies are providing access to telephone records for individuals. Stored in a database which is searchable over the Internet are a listing of telephone numbers or possibly E-mail addresses for large segments of the population. Internet users who employ these search capabilities may provide an individual's name or other relevant information, which is then used in a search of the database. Once the telephone number or other communications information is located, it may be presented to the Internet user through a screen display and a call may be placed by simply selecting the hypertext link representing the information for an individual fro the corresponding device.

SUMMARY OF THE INVENTION

The inventor has recognized that although AIN switches are an effective way of routing calls, some drawbacks do exist. The drawbacks may include the cumbersome method of programming the system through use of touch tone inputs and voice prompts. Further, an AIN system may contain limitations on the number of paths which may be programed for a particular number, or may have limitations with regards to programing during certain times of the day.

In light of the above described drawbacks, the inventor has provided a system which provides for the automated routing of telephone calls or other electronic communications. Through the system described herein, a connection may be established between the components of the public switch telephone network (PSTN) and a website on the Internet. Information which is extracted from the incoming calls to the PSTN may be used to search a database connected to the website containing routing information and then employ that information to route the communications incoming calls.

The system described herein may include a switching device within the PSTN which receives incoming calls from remote locations and act to route the calls to designated destinations. Included in the switching device is an apparatus for identifying and extracting the destination address for the calls received. The extracted destination address may then be provided to a service control point (SCP) which provides routing information relating to the destination address. The SCP incorporated in the PSTN may include an interface for connecting with a data network such as the Internet.

The SCP may include web browsing capabilities and may establish a connection with servers connected in the data network. Once a desired website is connected, the SCP may include the functionality to use the extracted destination address to perform a search of the records located at the selected website. Once information relating to the destination address is located, the information may be retrieved and used in the PSTN to route the incoming call. In this sense the SCP acts as a protocol translator of TCAP messages between the SSP and SCP on one hand, and TCP/IP messages between the website and the SCP on the other hand.

In one aspect of the invention, the SCP may further include a database which lists subscribers to an automatic routing service. When the destination address for the incoming call is extracted, a search may be performed of the database in order to determine if the destination address is associated with a subscriber of the service. If it is determined that the destination number is associated with a subscriber and the routing information is located in the communication server, the address may be converted to a search query by the SCP, and a search performed via the data network to locate communications information for the destination address.

In another aspect of the invention, the switching device may be part of an SS7 network and destination information is provided to the SCP via the Transaction Capabilities Application Part (TCAP). TCAP supports the exchange of noncircuit related data between applications across the SS7 network. Queries and responses sent between SSPs and SCPs are carried in TCAP messages. The SCP includes a TCP/IP interface to the Internet where searches may be performed in the databases located at various websites. Routing may be provided through both AIN and non-AIN switches. A non-AIN switch may send a TCP/IP message directly to the website to extract the routing information for the incoming call.

The websites which are accessed by the system described above, may include a number of relational tables which are searchable using the extracted destination address. The relational tables in the database are created by relating the various destination addresses to various routing information. For example, the routing information may direct that the incoming call, instead of ringing a home or office number, connect to a subscriber's voice mail. Also associated with the destination address may be other information which, based on the date, day of the week, or time of day, provides a destination address for establishing a line of communication.

In one aspect of the invention, the relational database may include a date table. In the date table, routing information is associated with a destination address depending on the date in which a subscriber is out of town and on travel. For example, the original destination address listed in a table for a particular subscriber may be a home phone number, a work number, and/or a cellular number. The subscriber knows that on a certain date he/she may not be able to answer any of these numbers, but will be able to answer at another number such as a hotel number and/or a office number. This routing address may be associated with the original destination address for a particular date. In the date table other information resident in the entries may include the date on which the association is applicable, the country in which the ultimate destination number will be answered, and the type of address (i.e., work, home, cellular) which is the ultimate destination address.

In yet another aspect of the invention, additional tables may also be stored in the relational database and associated with a particular destination address. As an example, in the time of day table, the subscriber enters routing information for different destination addresses when he/she is in town, i.e., normal place of residence. In this table, the original destination address may be a home phone, work phone or cellular phone for a subscriber. However, in this case, the routing information will be retrieved based on the particular day of the week and the time of day in which the connection is being attempted. In operation, a time interval for a particular destination address may be programed for the same time every day. In addition, the times of the day may be programed based on a particular day of the week. As with the date table, in the time of day table the routing address may be any destination established by the subscriber. These may include, but are not limited to, voice phone number, alternate work number and alternate home number, a cellular phone, and pager.

In yet another aspect of the invention, a special table for routing incoming pages may be provided. One function of this table is to automatically control the time periods when a pager will receive incoming pages. For example, the table may be located by performing a search using incoming pager address. Associated with the pager address may be a particular day of the week as well as particular time interval during that day when pages will not be received. Based on the time of day and the day a particular incoming call is received, the page may either be terminated or not.

In yet another aspect of the invention, the network server upon which the relational database is located include the functionality for a subscriber to access the information stored therein. The network server includes a number of display interfaces which may be presented over the network to the subscribers using a web browser. In one aspect of the invention, a first interactive screen display may be presented which provides the dialog boxes in which personal information for the subscriber may be entered. Once the subscriber has entered identifying information, routing information, such as telephone numbers, voice mail numbers, video phone numbers, E-mail addresses, may be presented.

While viewing the screen display described above, additional selections may be made by the subscriber to input programming as to the routing of incoming telephone calls. In other interfaces presented, information may be provided as to destination addresses to which calls will be routed when a particular number is dialed. The time of day, the day of the week, or the date may be associated with a particular routing address. Further, interactive screen displays may be provided for entering access information for pagers and other communications devices such as voice mail. Upon entry of the information described above, the data is stored in a relational database and is searchable by the PSTN as well as other external parties.

BRIEF DESCRIPTION OF THE DRAWINGS

FIG. 3 discloses a relational database table which includes communications information.

FIG. 4 discloses a relational database table which provides address associations based on date.

FIG. 5 discloses a relational database table which provides address associations based on day and time of day.

FIG. 6 discloses a relational database table which relates incoming pager addresses to times of day when pages may be received.

FIG. 9 discloses an interactive screen display through which information related to the date table may be viewed.

FIG. 10 disclose an interactive screen display through which information related to the time of day table may be viewed.

FIG. 11 discloses an interactive screen display through which programming information may be input for the pager unavailability schedule.

DETAILED DESCRIPTION

Figure 1:
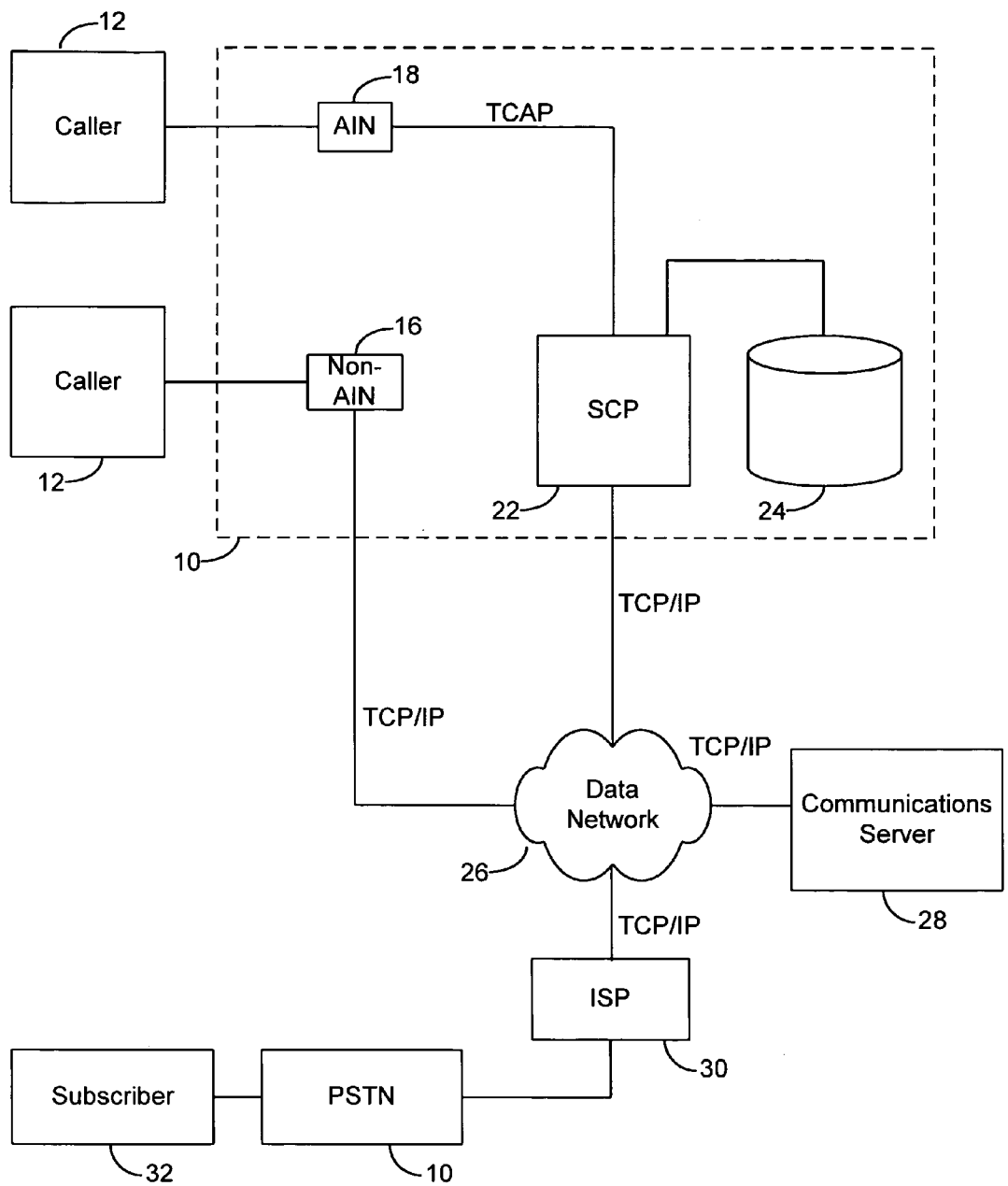
FIG. 1 discloses a system diagram for the telephone network in connection with the data network.

Disclosed in FIG. 1 is an overall diagram for the routing system described herein. Included in the system is the Public Switch Telephone Network (PSTN) 10. The PSTN, as is well known, is an electronic network which provides for audio and other types of communication between remotely located parties. The PSTN, based on destination addresses associated with incoming calls, routes the calls accordingly. As part of the present system, the PSTN detects incoming calls from caller 12. These calls may be received via land line phones or over a wireless network. Once calls are received, the destination addresses for the calls are extracted at the switching service points 14. SSP's are switches that originate, terminate or tandem calls. An SSP sends signaling messages to other SSPs to set up, manage and release voice circuits required to complete a call. An SSP may also send a query message to a centralized database (and Service Control Point (SCP)) to determine how to route a call. An SCP sends a response to the originating SSP containing the routing number associated with the dialed number. Alternate routing numbers may be used by the SSP if the primary number is busy or the call is unanswered within a specified time.

Communications between the SSP and the SCP may be facilitated through use of Transaction Capabilities Applications Part (TCAP) which supports the exchange of noncircuit related data between applications across an SS7 network. Query responses sent between SSPs and SCPs are carried in TCAP messages. For example, an SSP may send a TCAP query to determine the routing address associated with the dialed number, or to detect the personal identification number of a calling card user.

In connection with the SCP 22 may be a database 24 which may provide information relating to the routing of telephone calls. A connection may also be established from the SCP 22 and data network 26. The data network may be the Internet or any similar network which includes a number of nodes which may be accessed using a web browser or like device.

One node on the Internet may be communications information server 28. A number of network servers include relational databases which are searchable by parties over the Internet. As seen in FIG. 1, in addition to connections established by the SCP, connections may be established to the data network by the subscribers via non-AIN switches in the Public Switch Telephone Network to an Internet Service Provider (ISP) 30. A subscriber 32 may employ a personal computer with a modem to connect to the PSTN 10.

Figure 2:
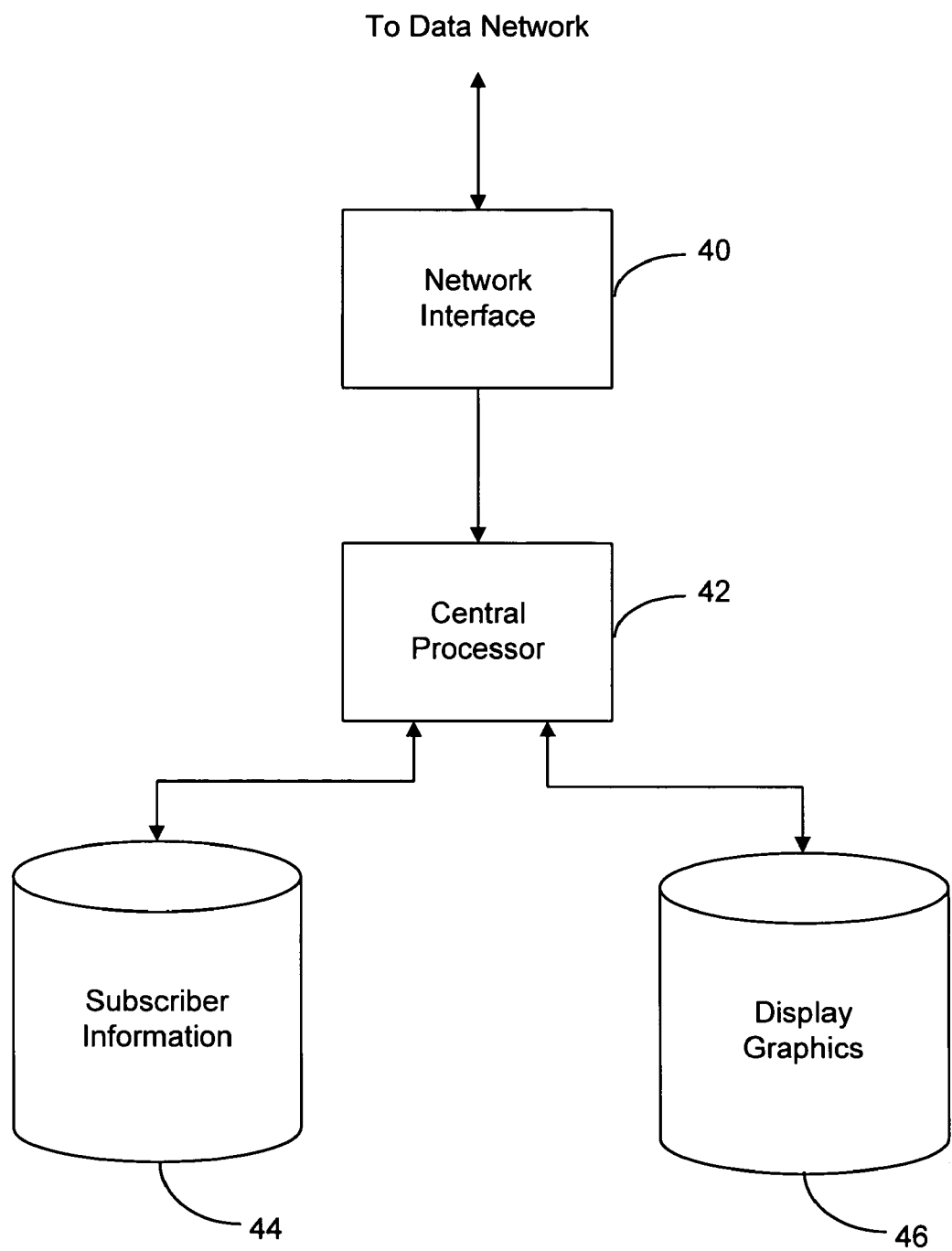
FIG. 2 discloses an internal system diagram for the network server.

Disclosed in FIG. 2 is an internal system diagram for the communications information server 28. Included in the network server is network interface 40 which provides for the exchange of signals from the server to the data network. The network interface 40 is connected to central processor 42 which controls the internal functions of the network server. Also in connection with the central processor 42 is subscriber information database 44 and display graphics database 46. Contained in subscriber information database 44 are various relational tables which contain information for routing telephone calls. Contents of the subscriber information database 44 will be discussed in greater detail below. Contained in display graphics database 46 are the interactive screen displays presented to subscribers when access is granted to the server. The use and operation of these interactive display graphics will be described in greater detail below.

As is well known in the use of PSTN's, Advanced Intelligent Network (AIN) switches are employed which provide for automatic routing of incoming telephone calls to preprogramed destinations. In an AIN system, information for routing of telephone calls stored in a database connected to a SCP. When a particular destination address associated with an incoming call is detected at a switching point, a signal may be sent to the SCP and the appropriate routing information retrieved. Once this information is known, the SCPs may provide routing information to the switch so as to direct the telephone call to the desired destination. One drawback of AINs currently employed is the difficulty which subscribers to the services may have in programing their choices. Programming commands are entered by dialing a particular destination, responding to voice prompts, and then entering key strokes through the telephone receiver to select choices or enter numerals.

According to the present invention, routing information for telephone calls received at Service Switching Points may be stored in a relational database which is accessible by a SCP over a data network such as the Internet. One advantage of storing information in such a location is that it is also accessible by subscribers through a personal computer over the data network and the information stored on the server may be accessed and updated at will. Also, callers with a PC can browse the database to initiate calls from the Internet via an ISP connection.

Disclosed in FIGS. 3–6 are examples of relational data tables which may be stored in the database 44 of communications server 28. In the table disclosed in FIG. 3, informational listings are provided for the subscribers to the services. Table 50 includes cells which include descriptive information for the subscriber as well as login ID and password. Further information that may be included in the table includes the subscribers country of origin, the time zone in which they are residents. Because the information stored in the table is accessible over a data network, various icons may be associated with the communications information stored therein. As can be seen, each subscriber may have icons for a work phone, home phone, numeric pager, toll-free number, wireless phone, voice mail, video phone, data conferencing, video conferencing, and e-mail. Associated with each of the icon types is the corresponding telephone number for that subscriber or other alpha numeric communications information. The number of listings shown is not meant as a limitation on the scope of the invention, and one skilled in the art would know any number of types of communication information may be stored in the table.

In one aspect of the invention, not only is this information accessible and searchable by a SCP, it may also be accessible by parties who access the communications network server to locate information relating to a particular subscriber. The data table described herein may be included as part of a commercial website which allows parties who establish a connection with the website to enter search terms (name of subscriber, email address and phone number) and locate communications information (such as phone numbers) for a particular party. When these parties gain access to the server and a service is performed for a subscriber, a display page may be presented which includes a number of icons which when selected establishes communications to a particular subscriber, either over the PSTN or the data network. A subscriber, after logging into the system may program the icons for the devices he/she owns. As can be seen in table 50, icons are associated with the particular icon address and when the icon is selected, the corresponding icon address will be presented to the subscriber.

Disclosed in FIG. 4 is a data table 60, which is employed by the system for associating particular icon addresses (i.e., phone numbers) with particular destination addresses depending on the particular date a icon address is used for routing. The table includes a number of columns. As can be seen, the column headings include destination address 62, destination type 64, travel date 66, visiting country 68, visiting country time zone 70, routing address 72, and routing address type 74. Each of the columns includes routing information with regards to a particular destination address. For example, as can be seen in the column headings, a number of different destination addresses for a work phone, home phone and cellular phone are associated with a routing address. This association is only good for the travel date of Oct. 15, 1998. Other information may be included in the table such as the country the subscriber is visiting on this date, the visiting country time zone, as well as the routing address type. The use of this table in the context of the system described herein will be described in greater detail below.

Disclosed in FIG. 5 is time of day table 80 employed for routing calls according to day and time. Also included in this relational database table are columns for destination address 82, destination type 84, day 86, time interval 88, routing address 90, and routing address type 92. This time-of-day table is employed in situations where a particular destination address is being routed to a predetermined routing address on a particular day at a particular time. In the example of row 94, a number of destination addresses are listed with responding address types. Also included is a day as well as a time interval. The programing information is entered such that on Sundays between a particular time period, any time any of the listed destination addresses listed in row 94 are called, the connection will be routed to the corresponding routing address. As can be seen, the routing address in row 94 is of the voice mail type.

Disclosed in FIG. 6 is a relational database table 80 which includes routing information for directing incoming calls for pagers. Included in the table is a destination address column 102, a destination type column 104, a day column 106, and time interval column 108. When a pager destination address associated with an icon address is detected, the table may be retrieved and based on the information stored in one of the rows such as 110, each page will be forwarded or it will be terminated.

In order for the system to operate employing the relational database tables described above, a hierarchy must be established as to the order in which routing information may be selected. As can be seen by review of the tables described above, the routing information has the possibility of overlapping in certain situations. For example, a subscriber may have entered routing information for a particular date. This routing information is included in the date table 60 of FIG. 4. In addition, a subscriber also may have programmed time of day information for routing the same telephone number in the time of day table disclosed in FIG. 5. In the situation where there is contradicting information, the system described herein may be programed to select the date information first. If no date information is located, then a search may be performed of the time-of-day tables. If no information is found there, then a search may be performed of the pager table 100.

Figure 7A:
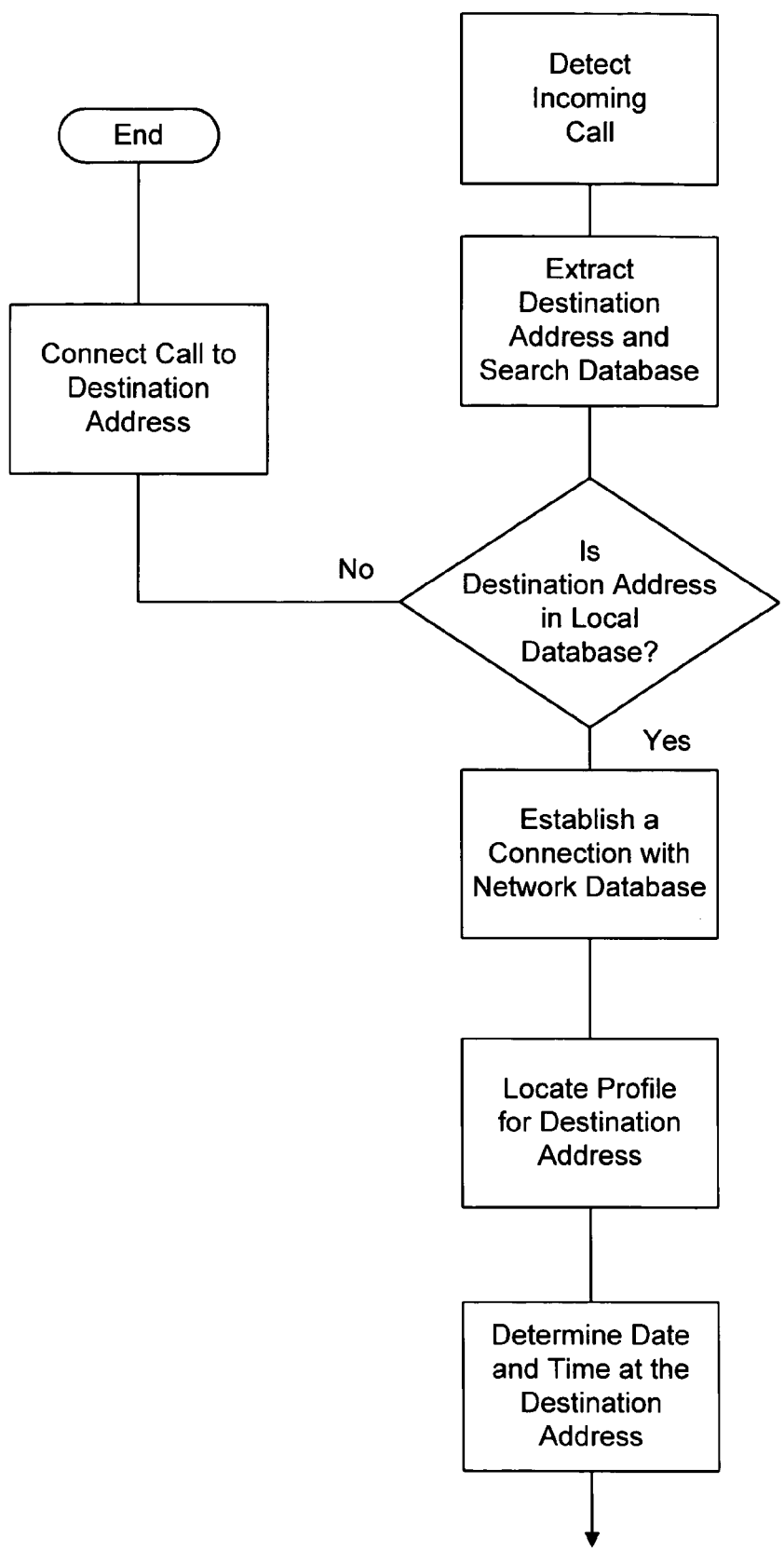
FIGS. 7a–c discloses a flowchart which describes the operation of the routing system.
Figure 7B:
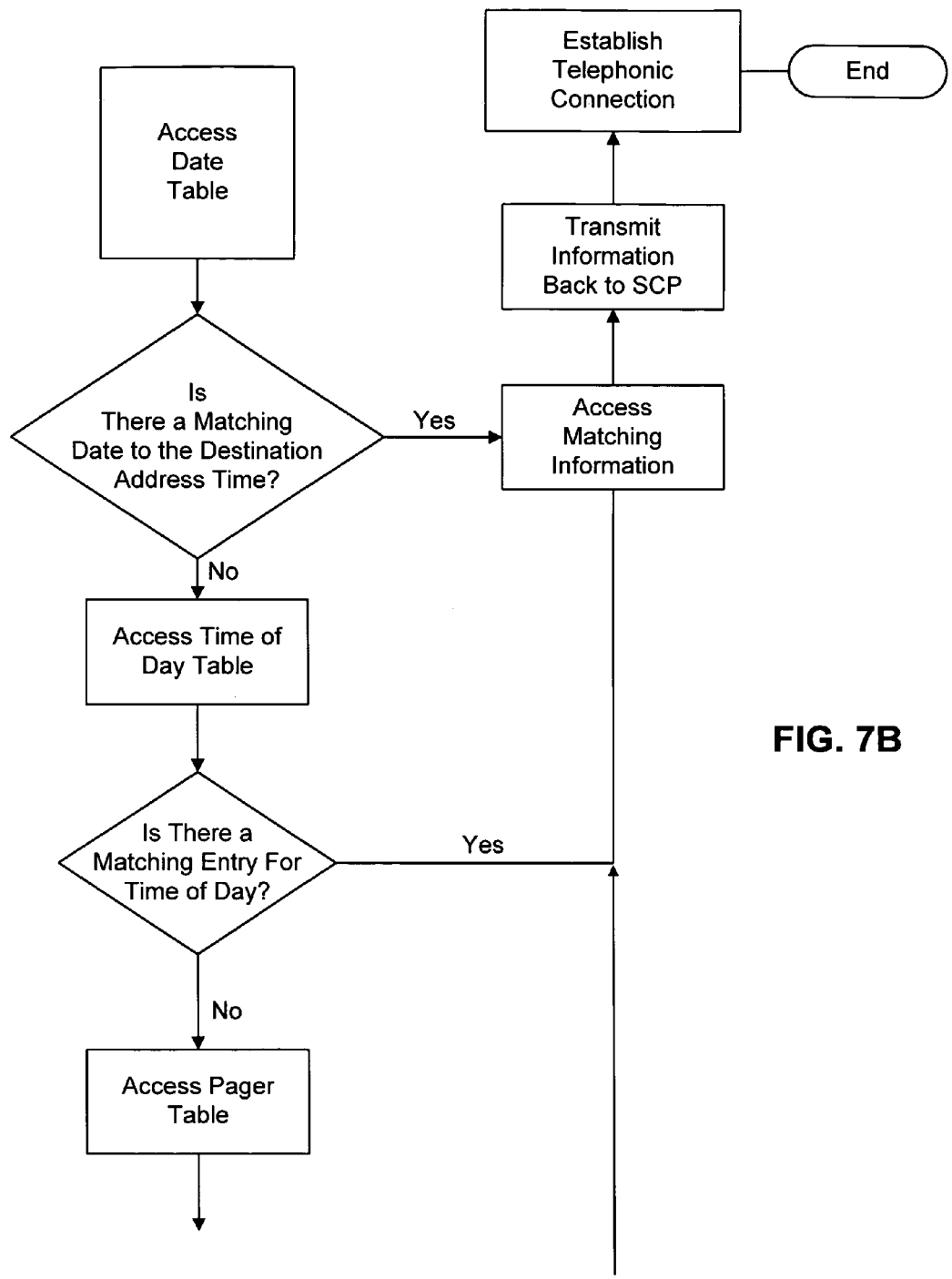
Figure 7C:
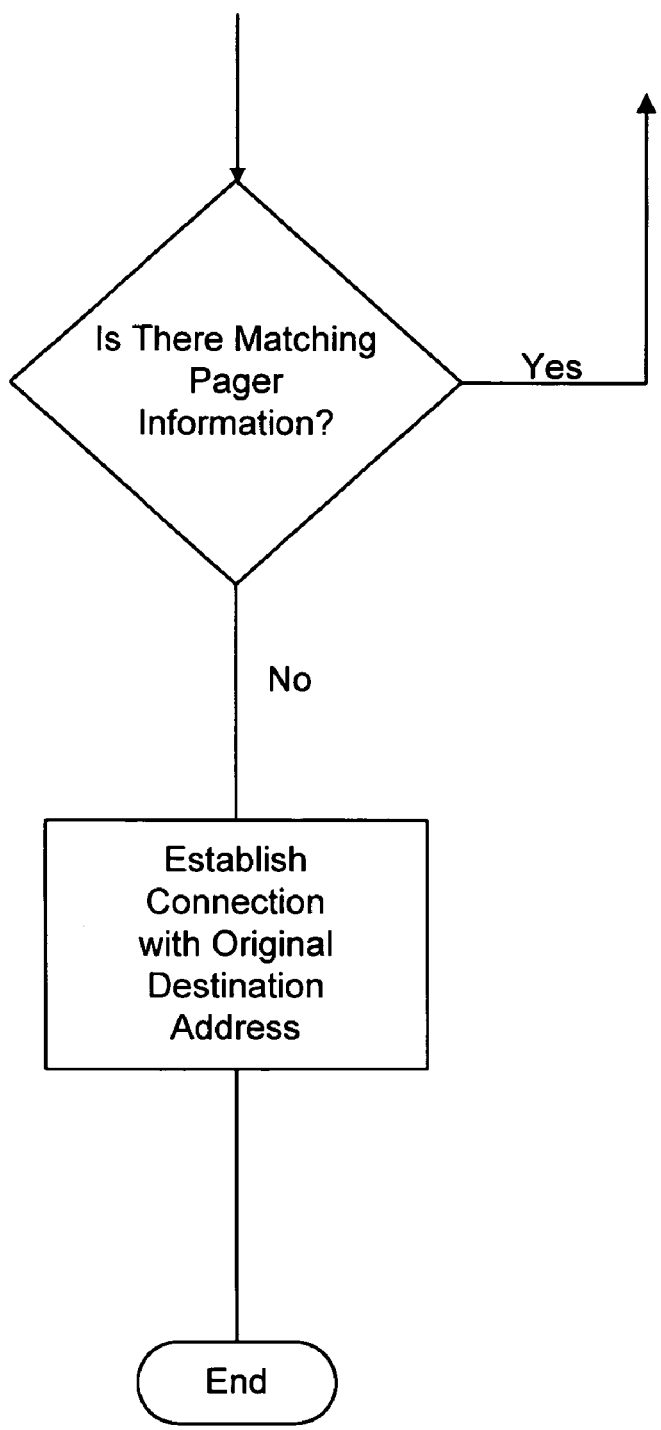

Disclosed in FIG. 7 is a flow chart which describes in detail the operations of the routing system described herein. Initially, an incoming call is detected at the AIN SSP and the destination address is extracted. At this point, a connection is established by the SCP over the data network with the communication server. If the incoming call is detected at the non-AIN SSP, the AIN SSP establishes a direct connection with the communications server. Using the destination address, a profile for the party to be called is then retrieved. Based on a profile given, a determination may be made then as to the current date and time for the location of the subscriber. This information may then be employed to identify routing information.

As was described above, in order to account for overlapping routing information for a particular subscriber, a hierarchy is established for the order in which tables that contain routing information for a particular subscriber are searched. In the embodiment of the invention described herein, the date table is given the highest priority, followed by the time-of-day table, and then finally the pager table.

Once the subscriber profile is located and the date and time the subscriber is receiving the incoming call are determined, a search is performed of the date table. Returning again to FIG. 4, a search is performed in column 62 to identify a matching destination address as to the one extracted from the incoming call by the PSTN. Once a matching address is found, the travel date in column 66 is read to make a determination as to whether the travel date matches the current time and date in the country which the subscriber is visiting. This is done by employing a lookup table which provides the times in the different time zones around the world (not shown). If the date is not matching, the search continues to find a matching day for the destination address and travel date which match the ones received from the telephone network. If matching information is located, the associated routing address is retrieved from column 72 and this information is provided over the data network to the SCP or the non-AIN switch. The PSTN, using this retrieved information, may then route the call to the routing address identified in the date table.

If no matching destination address information is found in the date table, a search is then performed in the time-of-day table of FIG. 5. As with the date table, a search is performed in the destination address column 82 to locate a matching address. Once the matching address is located, the day column 86 is searched to determine if it matches the current day in the county which the subscriber lives. If the day is not matching, a search continues to find a matching day. If no matching day is located, the search of the time-of-day table will end and the search of the pager table will begin.

If a matching day is found, a further analysis is performed to determine if the time interval within column 88 encompasses the current time in the county in which the subscriber lives. If the time is not matching, a search continues to find another interval within the same day. If no interval is located, the search will then continue in the pager table. If a matching interval is found, the routing address associated with the time interval in column 90 is retrieved and this information is provided to the PSTN for routing of the telephone call.

If no matching information is located in the time of day table, a search is then performed of the pager table disclosed in FIG. 6. As with the searches described above, a search is initially performed to locate a matching destination address in column 102. If the destination address for the incoming call does not match any of the destination addresses listed in the column, the search is terminated and the PSTN is directed to route the call to the destination address which was originally extracted from the incoming call. In the situation where a matching destination address is found, a search is then performed to locate the matching day of the week based on the country in which the subscriber lives. Once the matching day of the week is located, a further search is performed in column 108 to locate the matching time interval. If a matching time interval is found based on the country in which the subscriber lives, the PSTN will then be directed to terminate the page. If a matching day and/or time is not located, then the PSTN is directed to initiate the paging process.

An additional feature included in the system described herein is the functionality for subscribers to access and amend their own routing information in the communications network server. In order to perform this process, a subscriber would gain access to the network server through an ISP as shown in FIG. 1. The subscriber may employ a personal computer with a modem and web browser software. Once access is gained to the network server, a log on screen for gaining access to the system may be presented to the subscriber. Through this display screen (not shown), a subscriber may enter an user I.D. and password.

Figure 8:
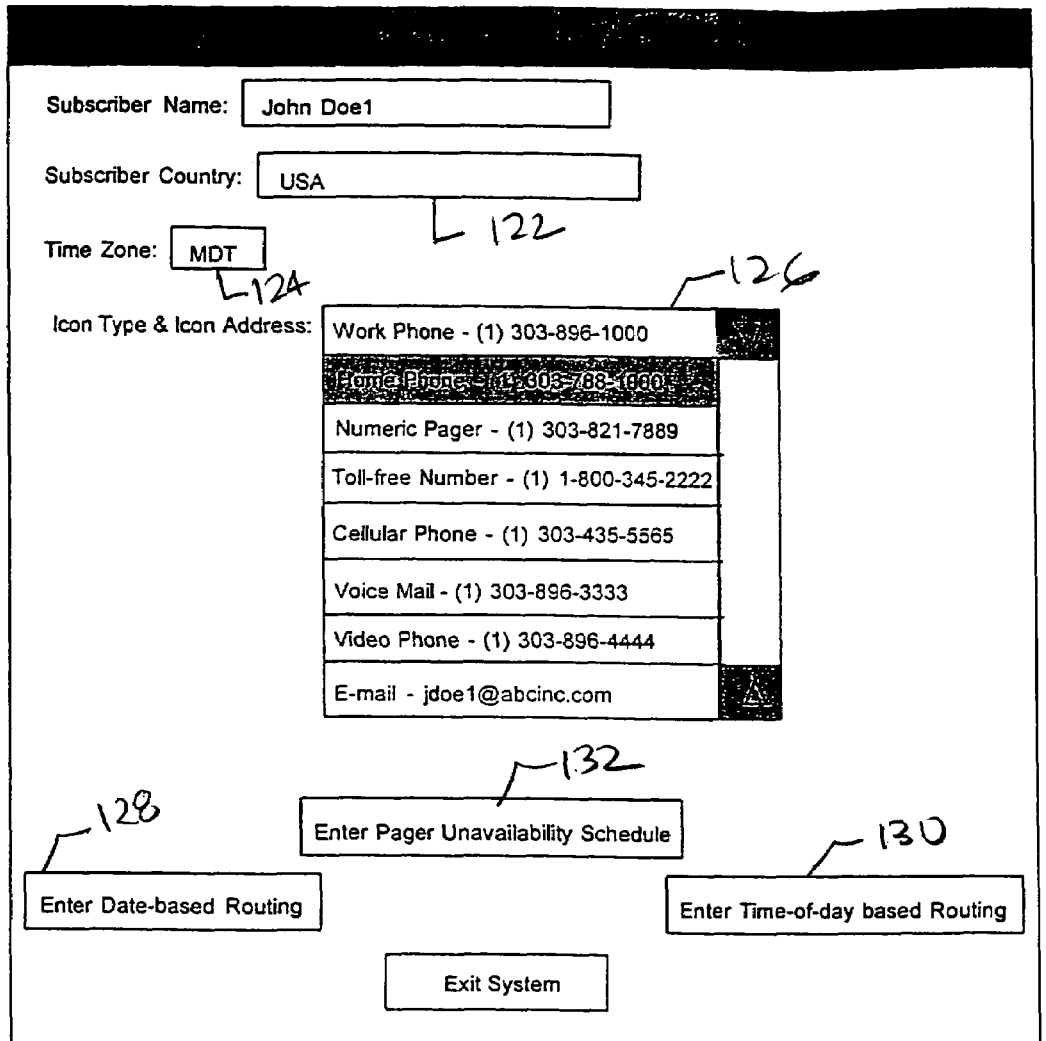
FIG. 8 discloses an interactive screen display through which system information may be viewed.

Once a logon is complete, a user may be presented an interactive screen display such as that shown in FIG. 8. In interactive screen display 20, a number of dialog boxes are provided through which a subscriber may either enter additional information or activate other functions of the system. Included in the screen display may be descriptive information for the subscriber such as the subscriber country 122 or the time zone within which the subscriber lives 124. The subscriber may edit this information using the dialog boxes shown. Personalized information for establishing icon type and destination addresses viewed and amended through dialog box 126. Through use of a pull down menu, an entire listing of telephone numbers and other communications information may be stored for a particular subscriber. Through this dialog box, the subscriber may amend their own personalized information.

With regards to entering routing information into the system, a number of functions for this purpose may be initiated through screen display 20. Upon selection of the enter date-based routing button 128, a subscriber is provided with a display screen through which date-based routing information may be entered. Selections may also be made of the enter time-of-day base routing button 130 or the enter pager unavailability schedule button 132.

Interactive screen display 140 is disclosed in FIG. 9. Through this screen display, a subscriber may enter customized information for date-based routing. Through dialog boxes 142 and 144, the subscriber may define the type of device and the destination address for which the date-based routing will apply. Presented in these boxes may be any of the destination addresses listed in dialog box 120 of FIG. 8. Returning again to FIG. 9, dialog box 146 provides for the entry and amendment of communications information for the date-based table. Columns are provided in the dialog box for entering a particular date of travel 148, the country which is to be visited 150, the time zone of the country to be visited 152, the routing address 54 to which incoming calls will be routed as well as the routing address type 156. Through the rows 158, the subscriber enters the necessary information corresponding with the columns. A number of pull down menus are provided in the dialog box 146 for entering or viewing certain types of information. In order to add particular row for entry of information, a subscriber may select the add-a-row button 162, which provides for another entry. When the entry or amendment of information is complete, the subscriber may select the "OK" button 160 and the information will be entered in the system.

Disclosed in FIG. 10 is a screen display 170 which provides for the presentation and amendments of information related to time-of-day based routing. As with the date-based table, dialog boxes are also included in screen display 170 for entering the subscriber's country, the time zone, the destination type and destination address. Also, included in the display graphic 170 is a dialog box 172, which provides for the entry of routing information based on time of day. Columns included in the dialog box include day 174, time interval 176, routing address 178, and routing address type 180. As can be seen in row 182, the subscriber may select a pull down menu in the day column 174 to select a particular day for which the routing information may be entered. In column 176, the time interval in which the routing information will apply may be entered. The destination address to which the call will be routed is listed in 178 and the type of address for this destination is described in 180.

In order to add additional information, the subscriber may select the add-a-row button 86. Once the desired information or amendments are complete, the subscriber may then select the "OK" button 184 for entry of this information into the system.

Finally, the display graphic 190 for presenting and amending information with regards to the pager unavailability schedule is disclosed in FIG. 11. Through the display graphic 190, a subscriber may enter information about the times of day or days in which pages will not be received. As with the above-described display graphics, dialog boxes are included in the display graphic 190 for entry of subscriber country, time zone, destination type, and destination address. Also included is a dialog box 192, which provides for the entry of information related to the routing of pages. Included in this display graphic are row 194, which provides for the selection of a particular day during the week in which the routing information will apply, and a time interval column 196, which designates the times within the selected day within which pages will not be received. As can be seen in row 198, a subscriber may employ a pull down menu in order to select a particular day of the week. Then in the time interval column 196, the particular time interval in which pages will not be routed to the subscriber is provided. To add additional information, the subscriber may select the add-a-row button 198. When all the routing information or amendments are complete, the subscriber may then select the "OK" button 200 to enter the information into the system.

Once the information has been entered into the system, tables are created or updated and the system may use the information stored in the relational tables in the manner described above. According to the system described herein, the subscriber may access the information at any time and provide additional routing information. The system may be further programmed to delete routing information after the date in which the routing information was applicable has passed or after a predetermined period.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant are, within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A user programmable system for routing telephonic traffic in a communications network comprising:
   a network server connectable to a data network wherein the network server is further configured to communicate with a service control point (SCP) in a telephonic network, said network server including:
      a subscriber profile database accessible by the SCP so as to provide telephonic routing information in response to a detected incoming telephone call to any of a plurality of destination addresses associated with a subscriber, the destination addresses associated with that subscriber each representing a different means for communication with that subscriber; and
      at least one interactive screen display presentable to system users accessing the network server over the data network wherein the interactive screen displays are configured such that the system users may review and establish directly in a central database routing instructions for one or more routing addresses based on the destination address and at least one of: date and time of day a connection is attempted with any of the plurality of destination addresses.

2. The system of claim 1 wherein the interactive screen displays are interactive pages accessible over the Internet using a commercial web browser.

3. The system of claim 1 wherein the one or more destination addresses include at least one of:
   home telephone number, work telephone number, wireless telephone number, pager number and IP telephony connection address.

4. The system of claim 1 wherein the telephonic network is configured as an advanced intelligent network (AIN).

5. The system of claim 1 wherein the at least one interactive screen display is configured for at least one of:
   receiving the one or more destination addresses information;
   receiving one or more routing addresses and related information routing for the one or more destination addresses;
   receiving additions, deletions, and amendments of the related information; and presenting and amending information with regards to pager unavailability.

6. A communications information system comprising:
a service control point in communication with the PSTN and a data network, the SCP being configured to receive a destination address for one or more detected incoming telephone calls in the public switched telephone network (PSTN);
a central communications server in communication with the data network which includes at least one database storing a plurality of subscriber profiles, at least a portion of the subscriber profiles having a plurality of destination addresses associated with that respective subscriber, the destination addresses associated with that subscriber each representing a different means for communication with that subscriber, the database being configured to be searchable for the subscriber profile associated with the received destination address;
the communications server being further configured to be accessible over the data network by the subscribers in order to review and establish directly at least their own profiles stored in the at least one database; and
the communications server being further configured to identify a profile in the subscriber database associated with the received destination address and to further identify routing information for the telephone call associated with the received destination address including a selected destination addresses based on subscriber programmed criteria, said routing information being transmittable over the data network to the SCP.

7. The system of claim 6 wherein the time includes at least one of: time of day and date.

8. The system of claim 6 wherein data network is the Internet.

9. The system of claim 6 wherein the routing information includes subscriber destination addresses which are selectable depending on when the incoming call is detected.

10. The system of claim 9 wherein the subscriber destination addresses include at least one of: home telephone number, work telephone number, cell phone number, pager number, IP telephony connection address.

11. The system of claim 6 wherein each profile in the database includes at least one of: a date table which includes customized routing information for the subscriber based on a particular date, a time of day table which includes the customized routing information based on a particular day and time of day the incoming call is received, and a paging table which includes the customized information relating to the subscriber for receiving pages.

12. The system of claim 11 wherein the SCP is programmable to search the date table, the time of day table, and the pager table in a predetermined order.

13. The system of claim 6 wherein the routing information is selected based on a provided location of the subscriber.

14. A method for establishing a communication connection over a telephone network, comprising:
receiving a destination address for a detected incoming telephone call in the Public Switched Telephone Network (PSTN);
establishing a connection over a data network with a central communications server which includes a database of subscriber profiles, at least a portion of the subscriber profiles having a plurality of destination addresses associated with that respective subscriber, the destination addresses associated with that subscriber each representing a different means for communication with that subscriber;
allowing a subscriber to access the communications server and review and establish at least one of his own or another subscriber's user profile directly in the database;
searching the database to identify one of the subscriber profiles associated with the received destination address;
selecting from the identified subscriber profile a subscriber provided routing information corresponding to the received destination address, based on the time the incoming telephone call was detected; and
transmitting the selected destination address to a switch in the PSTN; wherein the database is accessible by a service control point.

15. The method of claim 14 wherein the data network is the Internet.

16. The method of claim 14 wherein the time includes at least one of: time of day and date.

17. The method of claim 14 wherein the routing information comprises subscriber selected destination addresses.

18. The method of claim 17 wherein the subscriber selected destination addresses include at least one of: home telephone number, work telephone number, cell phone number, pager number, IP telephony connection address.

19. The method of claim 18 wherein the time is determined based on a geographic location provided by the subscriber.

20. A communications network for routing telephone calls to a subscriber, comprising:
a plurality of switches;
a service control point in communication with at least one of the switches;
a central database that is accessible by the service control point;
wherein the database is also directly accessible by authorized subscribers via the Internet to allow an authorized subscriber to review, create and modify a list of destination addresses associated with the authorized subscriber or another subscriber, the list including a plurality of destination addresses that each represent a different means for communication with the authorized subscriber, and information related to each of the destination addresses, the related information including routing information for each destination address;
wherein, as part of routing a telephone call, the service control point obtains routing information from the database.

21. A communications network as defined in claim 20, wherein the routing information stored in the database varies based on the time that the call is being processed by the service control point.

22. A communications network as defined in claim 20, wherein the routing information stored in the database varies based on the date that the call is being processed by the service control point.

23. A communications network as defined in claim 20, wherein the routing information stored in the database varies based on the time of day that the call is being processed by the service control point.

* * * * *